(12) United States Patent
Fukui

(10) Patent No.: US 11,842,467 B2
(45) Date of Patent: Dec. 12, 2023

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Takaaki Fukui, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 17/231,921

(22) Filed: Apr. 15, 2021

(65) Prior Publication Data
US 2021/0327036 A1 Oct. 21, 2021

(30) Foreign Application Priority Data
Apr. 21, 2020 (JP) .................... 2020-075609

(51) Int. Cl.
*G06T 5/00* (2006.01)
*G06K 9/00* (2022.01)
*G06V 40/16* (2022.01)

(52) U.S. Cl.
CPC ............ *G06T 5/008* (2013.01); *G06V 40/166* (2022.01)

(58) Field of Classification Search
CPC ........... G06T 5/008; G06T 2207/10024; G06T 2207/30201; G06T 5/50; G06V 40/166; H04N 5/23222; H04N 9/646; H04N 9/73
See application file for complete search history.

(56) References Cited

U.S. PATENT DOCUMENTS

| | | | |
|---|---|---|---|
| 11,120,528 B1* | 9/2021 | Seely | G06T 5/002 |
| 2013/0259374 A1* | 10/2013 | He | G06V 40/103 |
| | | | 382/173 |
| 2016/0269714 A1* | 9/2016 | Rhemann | G06V 10/143 |
| 2017/0076142 A1* | 3/2017 | Chang | G06T 7/90 |
| 2017/0124717 A1* | 5/2017 | Baruch | G06T 7/50 |
| 2019/0082160 A1* | 3/2019 | Yano | G06V 20/48 |
| 2020/0402139 A1* | 12/2020 | Higa | G07G 1/0036 |
| 2021/0012519 A1* | 1/2021 | Takama | H04N 5/23206 |
| 2021/0312638 A1* | 10/2021 | Ito | G06T 7/11 |
| 2022/0044064 A1* | 2/2022 | Zhang | G06V 10/761 |

FOREIGN PATENT DOCUMENTS

| | | |
|---|---|---|
| JP | 2014-153959 A | 8/2014 |
| JP | 2017-011652 A | 1/2017 |
| JP | 2018-182700 A | 11/2018 |

* cited by examiner

Primary Examiner — Todd Buttram
(74) Attorney, Agent, or Firm — CANON U.S.A., INC. IP Division

(57) ABSTRACT

An apparatus comprises a detection unit configured to detect an object region from an image, a first processing unit configured to perform first image processing on the object region, a second processing unit configured to perform second image processing on a region other than the object region, a first determination unit configured to determine, in the object region, a first referential region to undergo the first image processing and having a size approximating the object region; and a second determination unit configured to determine a second referential region having a size approximating the object region and different from the size of the first referential region, in order to determine the region to undergo the second image processing.

16 Claims, 5 Drawing Sheets

CASE OF CORRECTING BACKGROUND REGION

CASE OF CORRECTING PERSON REGION

IMAGE PROCESSING APPARATUS, IMAGE PROCESSING METHOD AND STORAGE MEDIUM

BACKGROUND OF THE DISCLOSURE

Field of the Disclosure

The aspect of the embodiments relates to an image processing apparatus that performs image processing for each region on images shot with a digital camera or other such device.

Description of the Related Art

Correction methods that extract an object region and correct the brightness of the object region and image processing apparatuses that correct the gradation of a region other than the object region have been proposed heretofore.

For example, Japanese Patent Laid-Open No. 2018-182700 discloses a technology for determining an object region and correcting the lighting of the object region. Through relighting processing using a virtual light source, it becomes possible to lighten dark areas such as shadows that occur due to ambient light and obtain a desired image.

In such cases, a known method of detecting an object region involves acquiring distance information and detecting a region at a distance within a predetermined range with respect to a distance value of the main object as the object region.

While there are multiple methods of acquiring distance information, a representative technique is a stereo method that involves acquiring images from a plurality of viewpoint positions, and calculating a distance based on the triangulation principle, using a parallax that is calculated from the correspondence relationship of pixels within those images. By acquiring distance information and detecting object regions, it becomes possible to distinguish between an object region on the near side and an object region on the far side.

For example, it becomes possible to perform control that involves changing the irradiated amount (intensity) of the virtual light source according to the difference in distance from the virtual light source to the object, between the case where one virtual light source is directed onto the near object and the case where one virtual light source is directed onto the far object.

Also, Japanese Patent Laid-Open No. 2014-153959 discloses a method that involves detecting a plurality of object regions and performing gradation correction for each object region, such as the region of the main object and a region other than the main object.

Methods of object region estimation that are used in the above methods include a method of estimating a body region from the result of face detection, a technique of estimating an object region using machine learning, and a method of detecting an object region through acquiring distance information.

However, in the case where the object region is not properly estimated, unnatural correction may be performed, such as performing correction that also lightens the background region when correcting the brightness of a person region, or improving the contrast of not only the background region but also the main object region when rectifying contrast through correcting the background region.

To address these issues, Japanese Patent Laid-Open No. 2018-182700 discloses a method of switching the means of acquiring object region information from object distance information and the means of acquiring object region information from an image, based on the relationship between shooting conditions and object conditions and the result of image analysis of objects.

However, with methods of object region estimation that use image information such as object continuity and face detection information, it is difficult to estimate the object region correctly in the case where the boundary between the background color and skin and clothing color is unclear. There are also similar issues with object region detection methods that use machine learning. With techniques using distance information, there is an issue in that estimation of an object region cannot be correctly performed on objects and the like that are at a close distance to the main object.

SUMMARY OF THE DISCLOSURE

According to a first embodiment of the present disclosure, there is provided an apparatus comprising: at least one memory configured to store instructions; and at least one processor in communication with the at least one memory and configured to execute the instruction to function as: a detection unit configured to detect an object region from an image; a first processing unit configured to perform first image processing on the object region; a second processing unit configured to perform second image processing on a region other than the object region; a first determination unit configured to determine, in the object region, a first referential region to undergo the first image processing and having a size approximating the object region; and a second determination unit configured to determine a second referential region having a size approximating the object region and different from the size of the first referential region, in order to determine the region to undergo the second image processing.

According to a second embodiment of the present disclosure, there is provided a method comprising: detecting an object region from an image; performing first image processing on the object region; performing second image processing on a region other than the object region; determining, in the object region, a first referential region to undergo the first image processing and having a size approximating the object region; and determining a second referential region having a size approximating the object region and different from the size of the first referential region, in order to determine the region to undergo the second image processing.

Further features of the disclosure will become apparent from the following description of exemplary embodiments with reference to the attached drawings.

DESCRIPTION OF THE EMBODIMENTS

Figure 1:
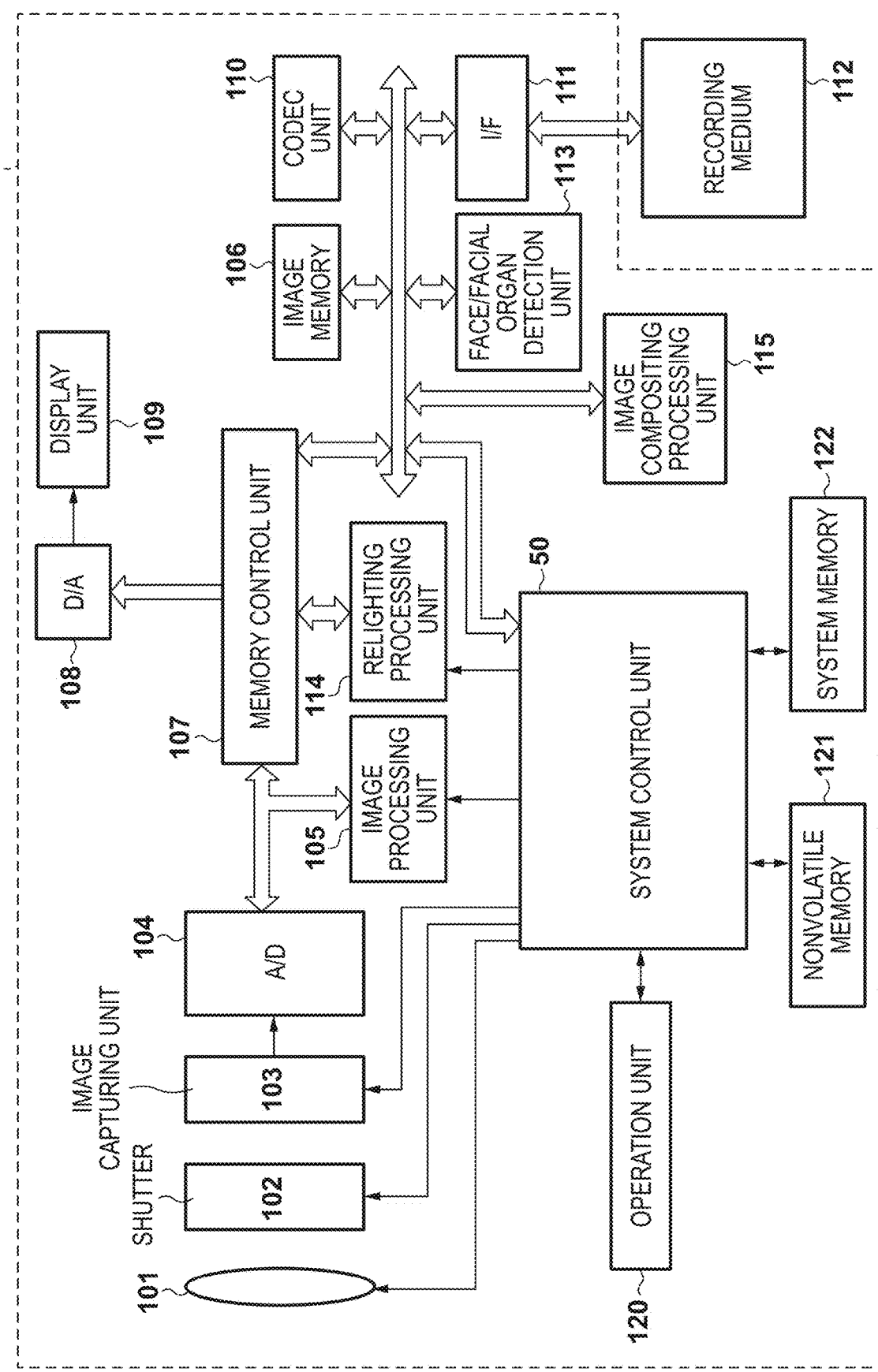
FIG. 1 is a block diagram showing the configuration of a digital camera according to an embodiment of the disclosure.

Hereinafter, embodiments will be described in detail with reference to the attached drawings. Note, the following embodiments are not intended to limit the scope of the claimed invention. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

Hereinafter, a digital camera serving as an embodiment of an image processing apparatus of the aspect of the embodiments will be described. The present embodiment will be described giving a digital camera (image capturing apparatus) as an example of the image processing apparatus, but the image processing apparatus of the aspect of the embodiments is not limited to an image capturing apparatus, and may be a personal computer (PC) or other such device, for example.

Generally, in the case of shooting an image of a person in a backlit scene, the background region will be overexposed when shooting is performed such that the person object is properly exposed. Also, conversely, the person region will be underexposed when shooting is performed such that the background region is properly exposed. In such cases, shooting will be performed with shooting conditions somewhere between the shooting conditions at which the person region will be properly exposed and the shooting conditions at which the background region will be properly exposed. However, an image shot in this manner will end up being an image in which both the person is dark and the background has insufficient contrast. FIG. 5A is a conceptual diagram envisaging a shooting scene to which the aspect of the embodiments is applied. The case where the background has low contrast and the person object appears dark is shown.

In order to correct the appearance of such an image, processing, is performed for correcting the brightness of the object region to be lighter and for improving the contrast of the background region. In a landscape scene such as a distant view of mountains, the ocean or a lake, contrast often decreases due to the influence of haze or water vapor in the air, and thus there is a high demand for improving the contrast of the background region.

In the present embodiment, correction processing for improving contrast is performed in background region correction, and relighting correction processing for correcting lighting, such as the brightness of an object or the direction of the light source with which an object is irradiated, is performed in the object region.

Configuration of Digital Camera

FIG. 1 is a block diagram showing the configuration of a digital camera 100 of the present embodiment.

In the digital camera 100 shown in FIG. 1, light that enters via a lens group 101 (image capturing optical system) including a zoom lens and a focus lens and a shutter 102 provided with an aperture function is photoelectrically converted in an image capturing unit 103. The image capturing unit 103 is constituted to be provided with an image sensor such as a CCD or CMOS sensor, and electrical signals obtained by photoelectric conversion are output to an A/D converter 104 as image signals. The A/D converter 104 converts the analog image signals that are output by the image capturing unit 103 into digital image signals (image data), and outputs the digital image signals to an image processing unit 105.

The image processing unit 105 performs various types of image processing such as white balance and other color conversion processing, gamma processing, edge enhancement processing and color correction processing on image data from the A/D converter 104 or image data read out from an image memory 106 via a memory control unit 107. Image data output by the image processing unit 105 is written to the image memory 106 via the memory control unit 107. The image memory 106 stores image data output by the image processing unit 105 and image data for displaying on a display unit 109. A face/facial organ detection unit 113 detects face regions and facial organ regions in which there are faces or facial organs of people from shot images.

In the image processing unit 105, predetermined evaluation value calculation processing is performed using the face detection results and facial organ detection results of the face/facial organ detection unit 113 and the shot image data, and a system control unit 50 performs exposure control and focus adjustment control based on the obtained evaluation value. Through-the-lens (TTL) autofocus (AF) processing, auto exposure (AE) processing, auto white balance (AWB) processing and other such processing are thereby performed.

Also, a D/A converter 108 converts the digital image data for display that is stored in the image memory 106 into analog signals and supplies the analog signals to the display unit 109. The display unit 109 performs display that depends on the analog signals from the D/A converter 108 on a display device such as an LCD.

A codec unit 110 respectively compresses and encodes image data stored in the image memory 106 based on a standard such as JPEG or MPEG. The system control unit 50 stores the encoded image data in a recording medium 112 such as a memory card or a hard disk, via an interface (I/F) 111. Also, image data read out from the recording medium 112 via the I/F 111 is decoded and decompressed by the codec unit 110, and stored in the image memory 106. Images can be reproduced and displayed by displaying image data stored in the image memory 106 on the display unit 109 via the memory control unit 107 and the D/A converter 108.

A relighting processing unit 114 performs relighting processing for directing a virtual light source onto the shot image to correct brightness. An image compositing processing unit 115 composites two types of images in accordance with a compositing map. The compositing map represents a compositing ratio of the two types of images.

The system control unit 50 controls the overall system of the digital camera 100. A nonvolatile memory 121 is constituted by a memory such as an EEPROM, and stores programs, parameters and the like required in processing by the system control unit 50. The system control unit 50 realizes the various processes of the present embodiment described later, by extracting and executing programs recorded on the nonvolatile memory 121 and constants and variables for use in operations by the system control unit 50 in a system memory 122. An operation unit 120 accepts operations such as menu setup and image selection by the user.

Flow of Image Correction Processing

Figure 2:
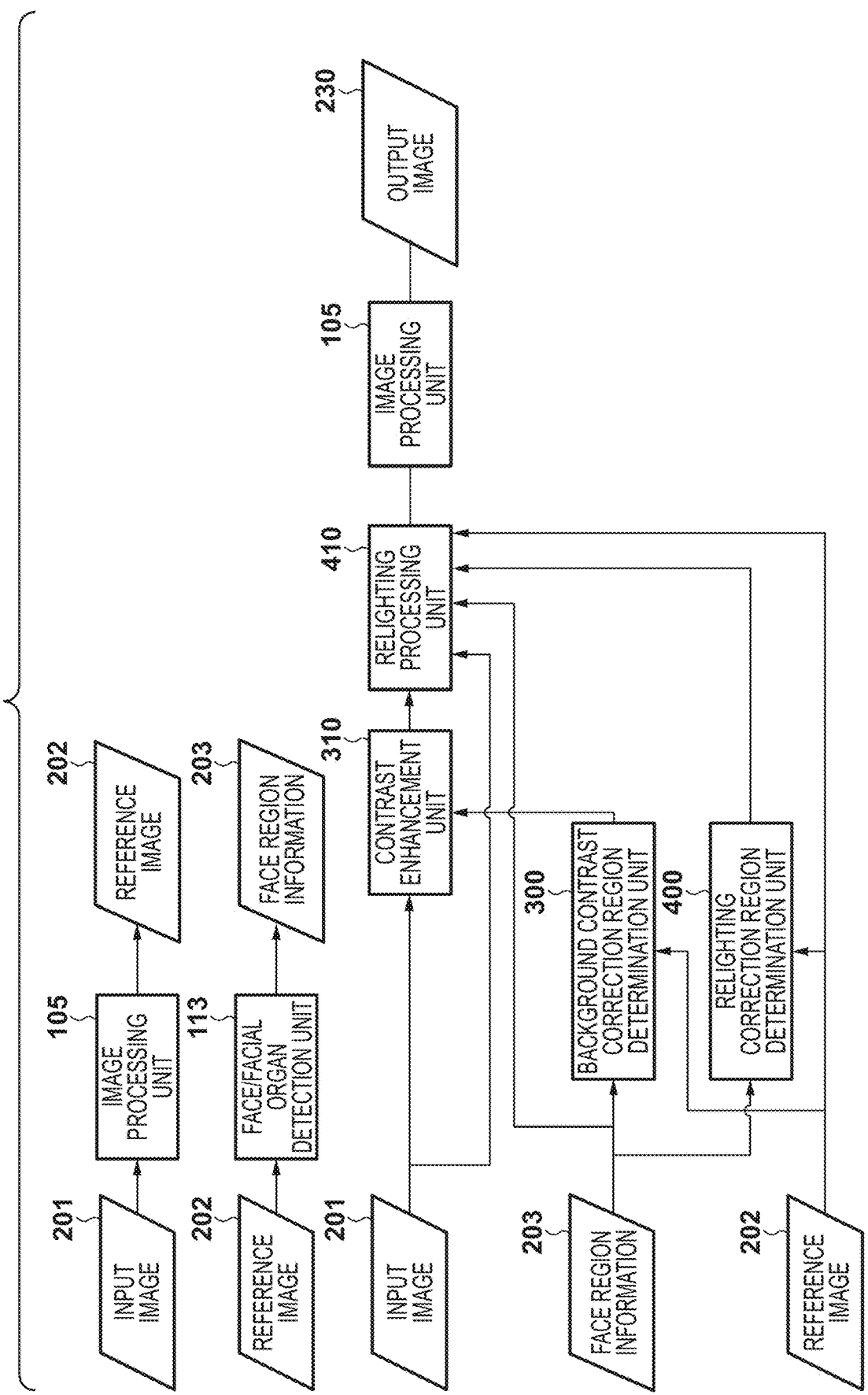
FIG. 2 is a block diagram showing the flow of processing in the embodiment.

FIG. 2 is a block diagram showing the flow of the processing in the present embodiment.

In FIG. 2, an input image 201 is input to the image processing unit 105, and a reference image 202 is generated. The reference image 202 that is generated here is for estimating a face region or body region, and is an image for which image quality settings suitable for face detection, body region detection and the like have been configured and that differs from an image whose white balance, color tone and other such settings have been configured by the user. It is favorable to configure settings that facilitate detection of face and body regions, such as setting auto white balance, color tone and saturation to normal, dark area correction to strong, and the brightness setting to bright, for example, even for images with many dark areas or images with high saturation.

In the face/facial organ detection unit 113, face region information 203 is generated using the reference image 202 generated by the image processing unit 105. The face region information 203 is information such as edge information of the face region, position information and angles relative to the image of facial organs such as the eyes, nose and mouth of the face, and face detection reliability indicating the detection accuracy of the position information of the facial organs. As for the face and facial organ detection method, techniques that uses template matching or machine learning and other such techniques are generally used.

A background contrast correction region determination unit 300 determines a region whose contrast is to be improved, based on the face region information 203 and the reference image 202. A contrast enhancement unit 310 improves the contrast of the contrast enhancement region (contrast correction processing region) determined by the background contrast correction region determination unit 300.

A relighting correction region determination unit 400 determines a region on which to perform lighting correction, based on the face region information 203 and the reference image 202. A relighting processing unit 410 performs relighting processing on the lighting correction region determined by the relighting correction region determination unit 400.

The contrast enhancement processing that is performed by the contrast enhancement unit 310 may be a method that is generally used, with gamma processing and sharpness enhancement processing for improving the ratio of dark areas to light areas as a gradation conversion characteristic, processing for enhancing local contrast and other such processing being used. Local contrast enhancement processing will be applied in the present embodiment.

Figure 3:
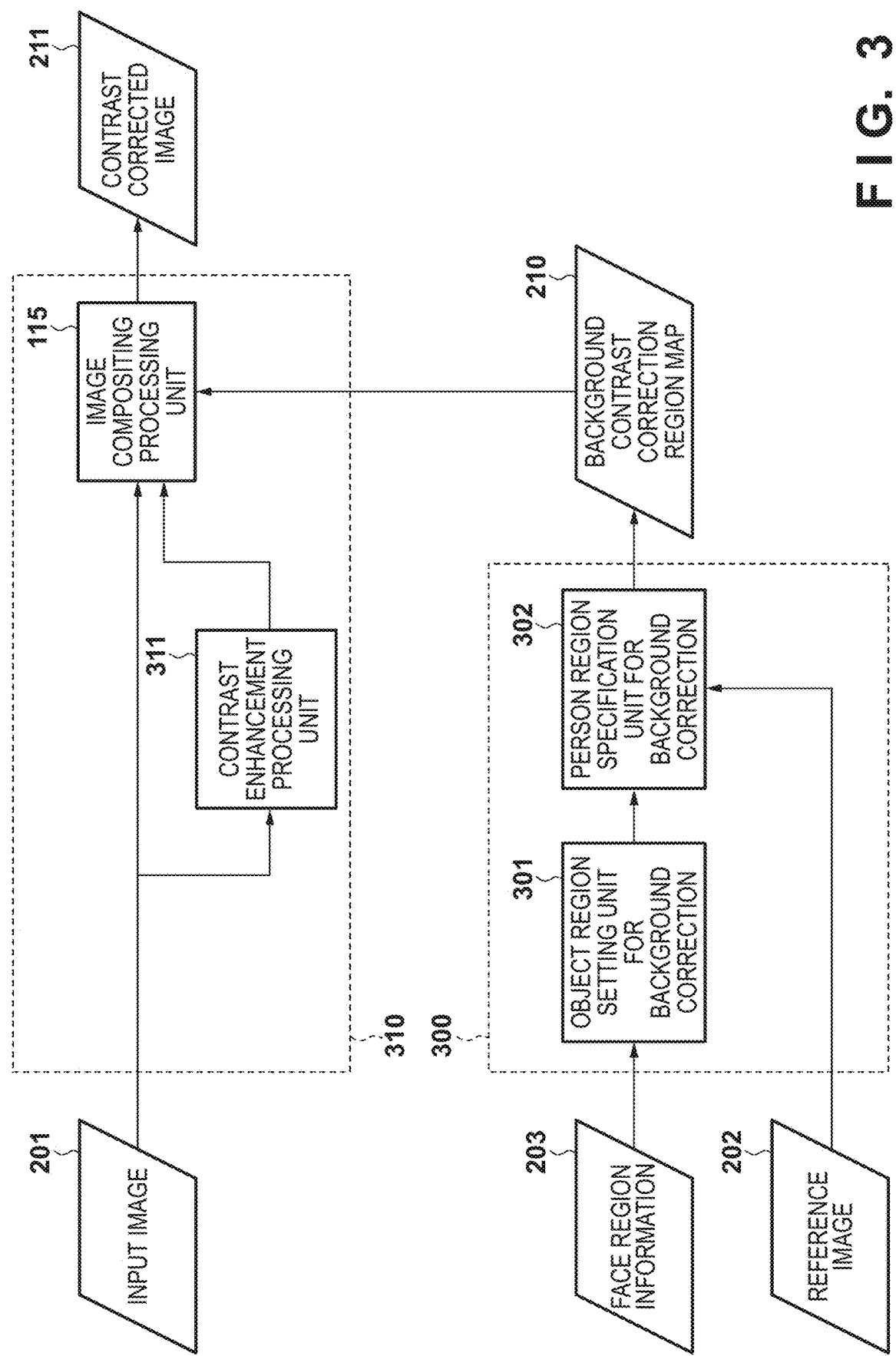
FIG. 3 is a block diagram showing the flow of background region correction processing in the embodiment.

FIG. 3 is a block diagram showing the flow of processing by the background contrast correction region determination unit 300 and the contrast enhancement unit 310 in the present embodiment.

In FIG. 3, an object region setting unit 301 for background correction determines an object region for performing background correction from the face region information 203. A person region specification unit 302 for background correction specifies the background region from the reference image 202 and the object region determined by the object region setting unit 301 for background correction, and generates a background contrast correction region map 210. The image compositing processing unit 115 determines a compositing processing ratio for each region based on region/level information of the background contrast correction region map 210, and performs processing for compositing the input image 201 and the output image of the contrast enhancement processing unit 311.

The background contrast correction region map 210 that is generated by the person region specification unit 302 for background correction is region information indicating a region determined to be the background region, and is information of a portion that was not determined to be a person region. In other words, this information is region information in which the region determined to be a person region and the determination level at which the person was determined are inverted, and corresponds to region information indicating the correction level of contrast correction in the compositing processing unit 115.

Figure 4:
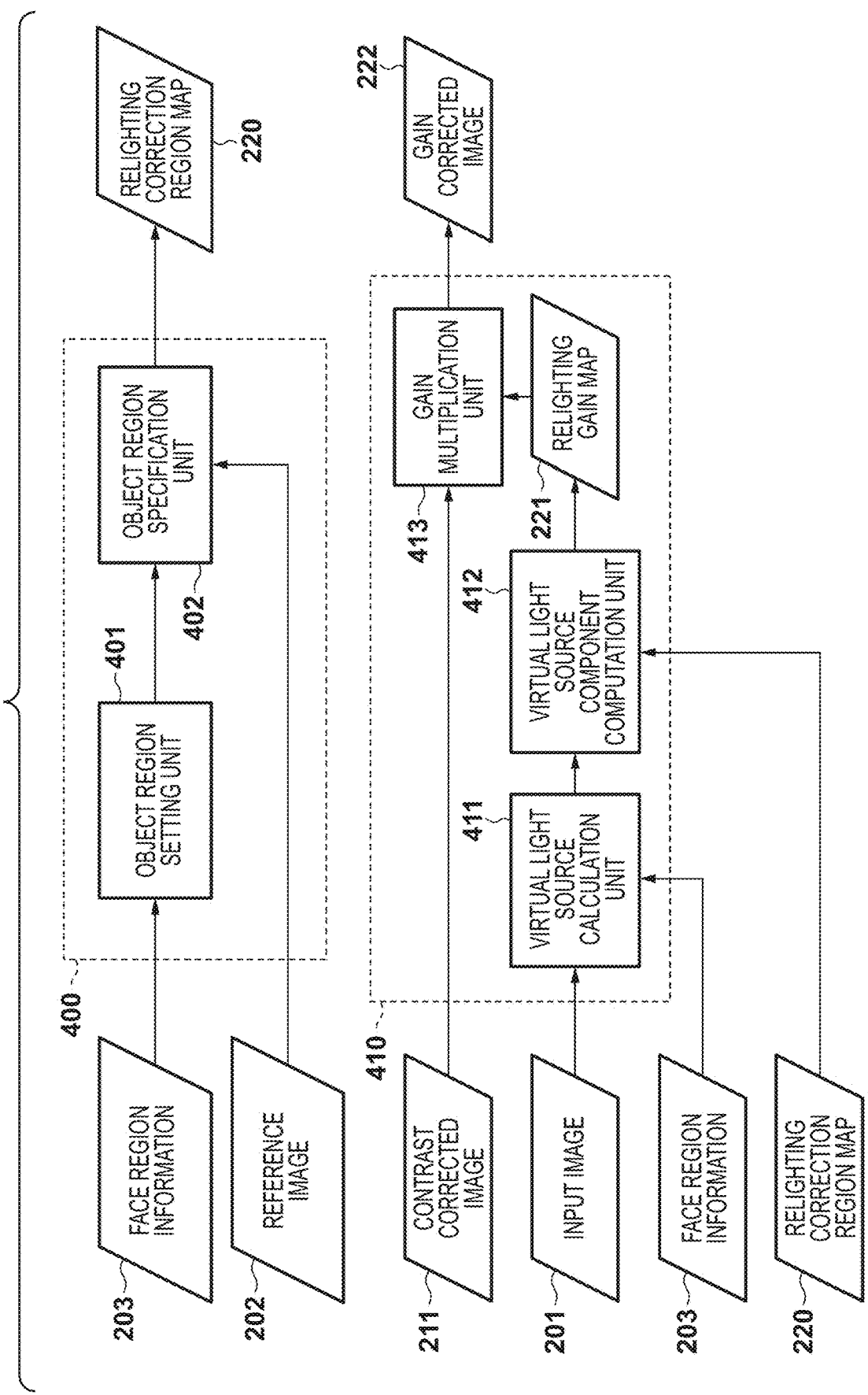
FIG. 4 is a block diagram showing the flow of person region correction processing in the embodiment.

FIG. 4 is a block diagram showing the flow of relighting processing in the relighting correction region determination unit 400 and the relighting processing unit 410 in FIG. 2.

The object region setting unit 401 sets an object region, based on the face region information 203. An object region specification unit 402 generates a relighting correction region map 220, using the object region set by the object region setting unit 401 and the reference image 202.

A virtual light source calculation unit 411 generates light source information of the virtual light source, using the input image 201 and the face region information 203. A virtual light source component computation unit 412 generates a relighting gain map 221, using the virtual light source information calculated by the virtual light source calculation unit 411 and the relighting correction region map 220. The relighting gain map 221 is a gain map that represents correction gain for correcting the brightness of the object region by image region. A gain multiplication unit 413 performs gain multiplication on a contrast corrected image 211 for each object region, according to the relighting gain map 221.

Note that since the method for generating light source information of the virtual light source in the virtual light source calculation unit 411 and the method for computing the virtual light source component in the virtual light source component computation unit 412 are described in detail in Japanese Patent Laid-Open No. 2018-182700, description thereof will be omitted in the present embodiment. Although Japanese Patent Laid-Open No. 2018-182700 implements relighting processing during processing by a signal processing circuit, the relighting processing is performed after degamma processing in terms of the flow of processing, and effects are obtained that are substantially equivalent to the relighting processing being performed before implementation of signal processing as in the present embodiment.

Body Referential Image Application Method

Next, the object region setting method of the object region setting unit 301 for background correction in FIG. 3 and the object region setting unit 401 in FIG. 4 will be described.

In the present embodiment, a person referential image (person referential region) that includes a face and body region is set in advance. The face region of the person referential image has facial organ information such as the eyes, nose and mouth of a face. The person referential image is made to conform to the regions of the actual image by being scaled and rotated, such that the organ information of the person referential image coincides with the positions of organ information such as the eyes, nose and mouth of the face detected from the shot image. Also, the person referential image is set so as to have a gradation that reduces the determination level for the person region in a direction toward the periphery of the person region.

The person referential image for background region correction uses a model (object model image) in which the body portion is set to a large body region compared with a typical body model, and the person referential image that is used by the object region setting unit 401 uses a model in which the body portion is set to a small body region compared with a typical body model. Similarly, with regard to the region corresponding to the head of the person region, a model in which the head is set to a large region compared with a typical body model may be used with the person referential image for background region correction, and a model in which the head is set to a small region compared with a typical body model may be used with the person referential image that is used by the object region setting unit 401.

Figure 5C:
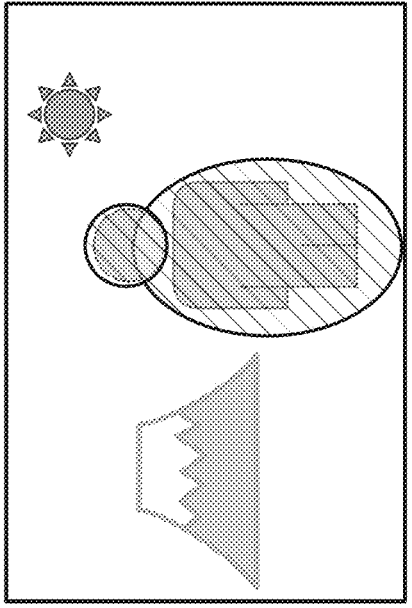
FIGS. 5A to 5C are conceptual diagrams envisaging a shooting scene to which the aspect of the embodiments is applied.
Figure 5B:
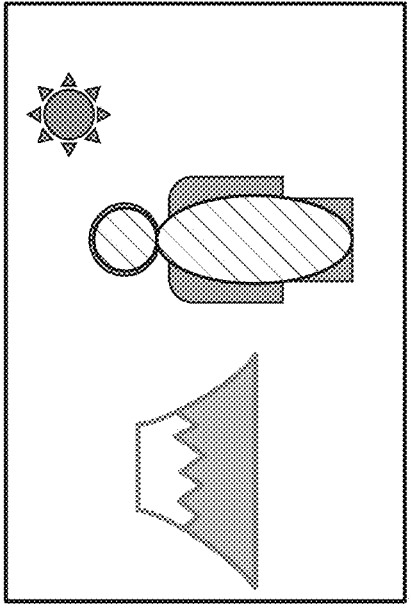
Figure 5A:
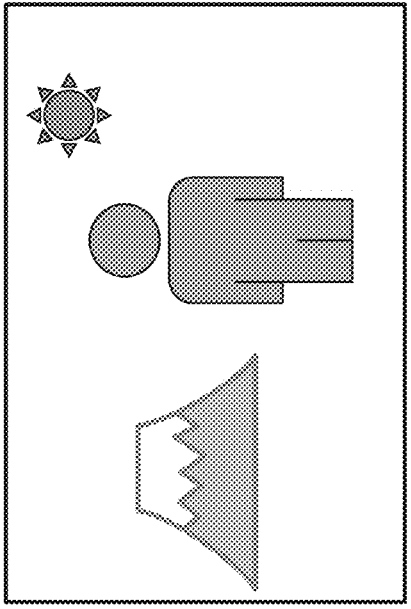

FIGS. 5A to 5C are conceptual diagrams showing an example application of the object model in the present embodiment. FIG. 5B shows a referential image that is applied (that is targeted) in the case of relighting processing for correcting the brightness of the person region, and the person referential image is set, with respect to the image shot of the backlit person in FIG. 5A, so as to fit inside the person.

FIG. 5C shows a referential image that is adapted to the case of correcting the background region, and the person referential image is set, with respect to the image shot of the backlit person in FIG. 5A, so as to extend outside the person. Also, since the face region has a large amount of organ information such as eyes and mouth, compared with the body region, the detection accuracy of the face region is high. Thus, the size of the head region of the referential image may be set to be comparable with the actual image or such that the enlargement/reduction ratio to the actual image is small, compared with the body region. Both FIGS. 5B and 5C show cases where the ratio of the head region of the referential image to the actual image is set small, compared with the body region.

The object region specification method of the person region specification unit 302 for background correction in FIG. 3 and the object region specification unit 402 in FIG. 4 involves performing object region specification processing such that the object referential image conforms to the edge of the object by performing shaping processing with reference to the pixel values of the reference image 202, as described in Japanese Patent Laid-Open No. 2017-11652.

In this way, when object region specification processing that conforms the object referential image to the edge of the object is applied by the object region specification unit 402, in the person region specification unit 302 for background correction that is for correcting the contrast of the background region, a person specification region is set so as to extend outside the person. Also, since the person specification level decreases from the inside to the outside of the person, an operation strengthening the contrast is performed on the outer side of the person according to the background contrast correction region map 210 in which the specified region setting level is inverted. In other words, the region is determined less to be the background region, the closer the region is to the person region, and accordingly, contrast enhancement processing is also applied less, the closer the region is to the person region.

On the other hand, the object region specification unit 402 in relighting is set such that the inside of the object region is the correction region, and the object correction amount decreases from the inside to the outside of the object region. Along with this, processing is performed such that the object region does not extend outside the object. In other words, brightness correction is performed mainly on the inside of the object, and the object region specification unit 402 operates such that the brightness correction level decreases toward the outside of the object. This has the effect of preventing brightness correction of the person region from extending outside the person region.

Also, the object region specification processing involves performing shaping processing of the object region on the basis of edge information of the image. However, since the person referential image is selected so as to not overlap with the respective correction regions, correction failure can be effectively avoided, even in cases such as where the edge of the object region cannot be detected.

A configuration may be adopted in which the person referential image that is used in the object region setting unit 301 for background correction in FIG. 3 and the object region setting unit 401 in FIG. 4 of the present embodiment is prepared for every orientation of the face in the left-right direction. A person referential image of the optimal angle may be selected, according to information on the orientation of the face detected from the image. Also, a three-dimensional model including a face region and a body region may be prepared, and a body referential image may be generated according to the angle of the face. Also, in addition to preparing a referential image for every angle of the face, a referential image of the face and a referential image of the body region may be respectively prepared for every angle. The model of the face angle may be selected according to the face angle detected from the image, a plurality of body regions having different angles from the neck down may be applied to a lower region of the face of the actual image, and the angle at which the distribution of the person region is the smallest or the angle at which the degree of similarity within the region is the highest may be set as a referential image of the person region.

Also, the present embodiment described having a referential image for the case of correcting the object region and a referential image for the case of correcting a region outside the object region, that is, a plurality of referential images, and selecting a referential image to be used therefrom. However, a configuration may be adopted in which there is a common referential image for both the case of correcting the object region and the case of correcting a region outside the object region, and the scale factor of that referential image is changed for the head region and the body region depending on the case to which the referential image is applied.

In the present embodiment, a method of estimating the object region from the size and direction of the face region is used in object region estimation, but the aspect of the embodiments is not limited to that method, and there are region estimation methods that use machine learning and other such methods. Similarly with these methods, the body region is often not correctly extracted, in the case where the color tone or pattern of the body region closely resembles the background region, and the aspect of the embodiments is also applicable in such cases.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-075609, filed Apr. 21, 2020 which is hereby incorporated by reference herein in its entirety.

What is claimed is:

1. An apparatus comprising:
at least one memory configured to store instructions; and
at least one processor in communication with the at least one memory and configured to execute the instruction to function as:
a detection unit configured to detect an object region from an image;
a first processing unit configured to perform first image processing on the object region;
a second processing unit configured to perform second image processing on a region other than the object region;
a first determination unit configured to determine, in the object region, a first referential region to undergo the first image processing, the first referential region having a size that is approximating the object region and is smaller than the object region;
a second determination unit configured to determine a second referential region having a size that is approximating the object region is larger than the object region, in order to determine the region to undergo the second image processing; and
an estimation unit configured to estimate the object region from the size and a direction of the first reference region.

2. The apparatus according to claim 1,
wherein the detection unit detects a region of a face and a region of a body as the object region, and
the first determination unit differentiates an extent to which the first referential region is made smaller than the object region, between the region of the face and the region of the body.

3. The apparatus according to claim 2, wherein the first determination unit determines the extent to which the first referential region is made smaller than the object region such that the region of the body is made smaller by more than the region of the face.

4. The apparatus according to claim 2,
wherein the detection unit detects a region of a face and a region of a body as the object region, and
the second determination unit differentiates an extent to which the second referential region is made larger than the object region, between the region of the face and the region of the body.

5. The apparatus according to claim 4, wherein the second determination unit determines the extent to which the second referential region is made larger than the object region such that the region of the body is made larger by more than the region of the face.

6. The apparatus according to claim 1, wherein the first image processing is relighting processing.

7. The apparatus according to claim 1, wherein the second image processing is contrast correction processing.

8. The apparatus according to claim 1, wherein the first determination unit and the second determination unit transform an object model image based on the image and a detection result of a region of a face, and determine the first referential region and the second referential region.

9. A method comprising:
detecting an object region from an image;
performing first image processing on the object region;
performing second image processing on a region other than the object region;
determining, in the object region, a first referential region to undergo the first image processing, the first referential region having a size that is approximating the object region and is smaller than the object region;
determining a second referential region having a size that is approximating the object region and is larger than the object region, in order to determine the region to undergo the second image processing; and
and
estimating the object region from the size and a direction of the first reference region.

10. The method according to claim 9, wherein the first image processing is relighting processing.

11. The method according to claim 9, wherein the second image processing is contrast correction processing.

12. The method according to claim 9, wherein the determinings transform an object model image based on the image and a detection result of a region of a face, and determine the first referential region and the second referential region.

13. A non-transitory computer-readable storage medium storing a program for causing a computer to execute processes of a method, the method comprising:
detecting an object region from an image;
performing first image processing on the object region;
performing second image processing on a region other than the object region;
determining, in the object region, a first referential region to undergo the first image processing, the first referential region having a size that is approximating the object region and is smaller than the object region;
determining a second referential region having a size that is approximating the object region and is larger than the object region, in order to determine the region to undergo the second image processing; and
estimating the object region from the size and a direction of the first reference region.

14. The non-transitory computer-readable storage medium according to claim 13, wherein the first image processing is relighting processing.

15. The non-transitory computer-readable storage medium according to claim 13, wherein the second image processing is contrast correction processing.

16. The non-transitory computer-readable storage medium according to claim 13, wherein the determinings transform an object model image based on the image and a detection result of a region of a face, and determine the first referential region and the second referential region.

* * * * *